Dec. 26, 1939.  O. SCHAERER  2,184,475
TURRET LATHE
Filed Oct. 10, 1938   3 Sheets-Sheet 1
Fig.1
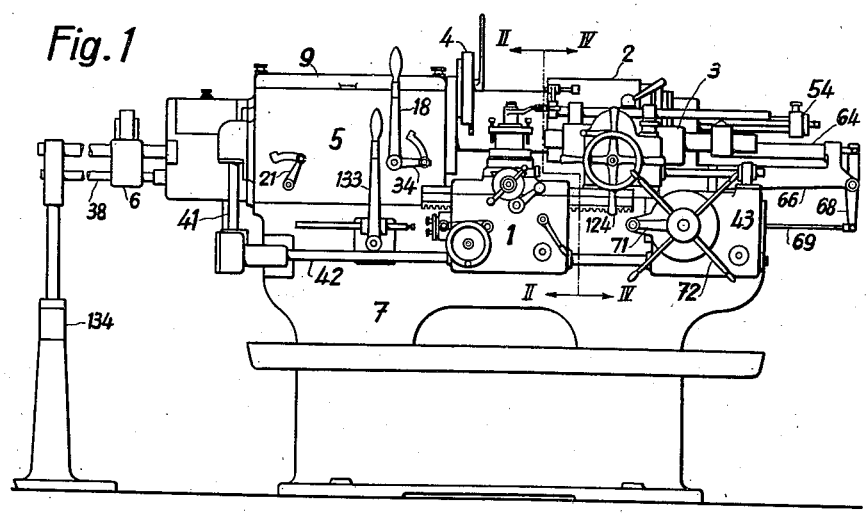
Fig.2
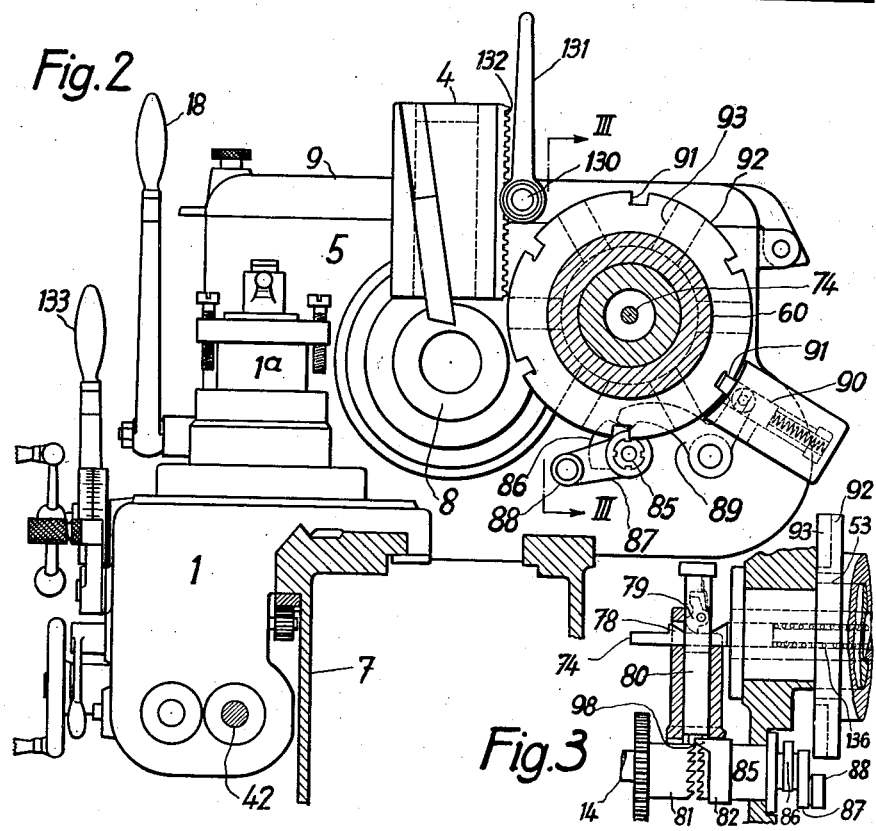
Fig.3
Inventor:
O. Schaerer,
By E. F. Wenderoth
Atty

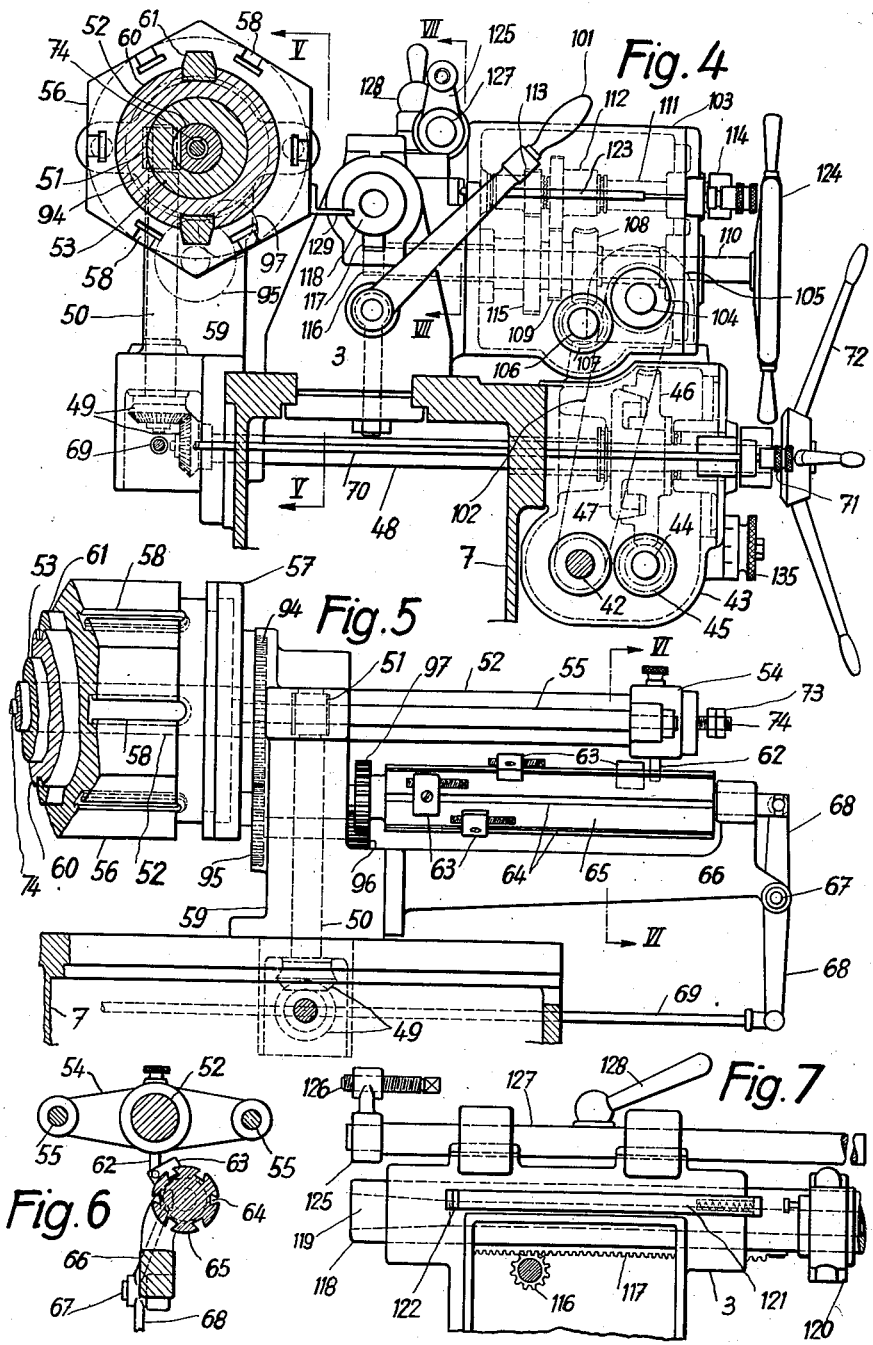

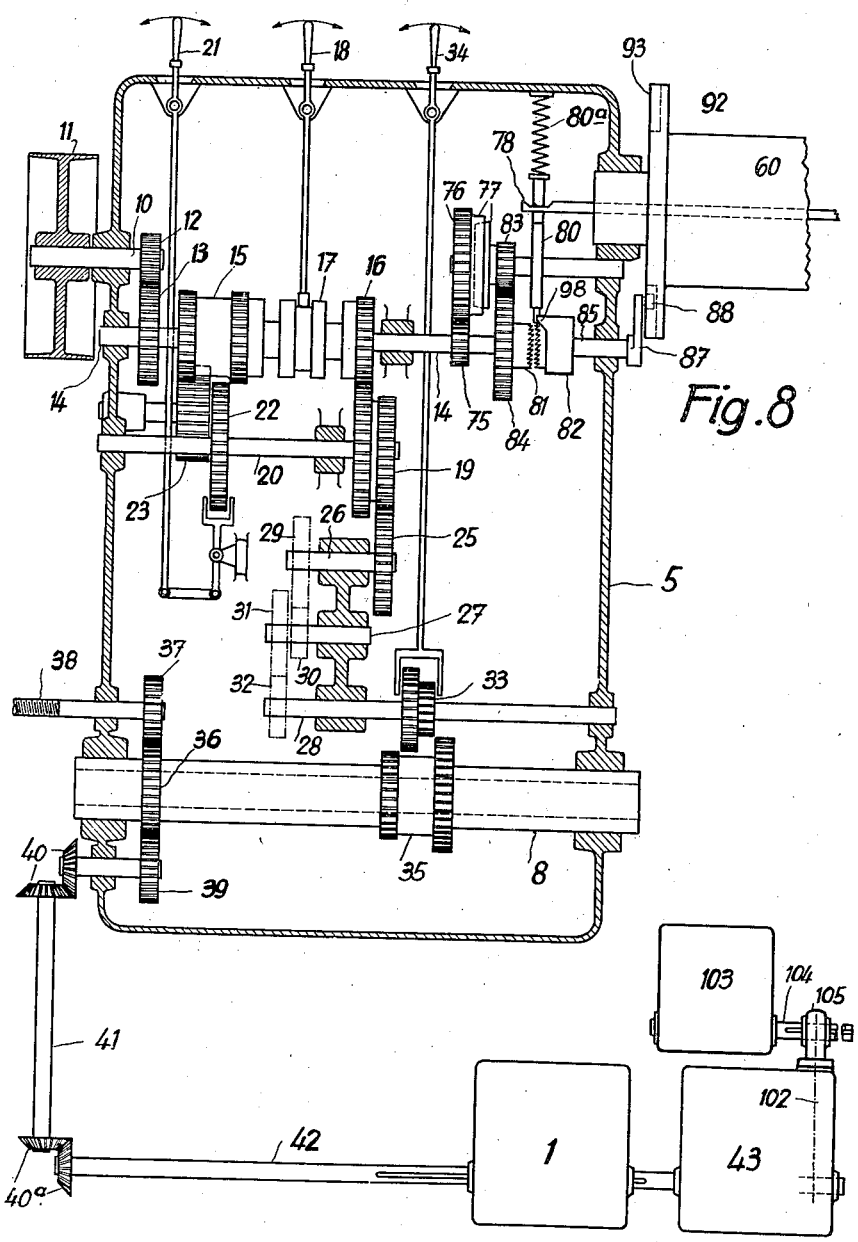

Patented Dec. 26, 1939

2,184,475

UNITED STATES PATENT OFFICE 2,184,475

TURRET LATHE

Otto Schaerer, Basel Switzerland

Application October 10, 1938, Serial No. 234,225
In Switzerland October 23, 1937

6 Claims. (Cl. 29—43)

The present invention relates to turret lathes and has for its main object to provide a turret lathe or revolver lathe which is specially adapted for working from rods of material.

It will be evident that in being made suitable for both working from the rod and producing chuck work will be the construction most suitable for either of these types of work. This will now be explained more in detail with reference to the example of a usual turret lathe, the tool spindle or clamping devices of which have a material-passage aperture of about 60 mms. diameter, thus being suitable for a working range of rod material up to 60 mms. diameter and for chuck up to 350 mms. diameter, as is usual with machines of this type.

For working rods the speeds of the spindle are required to be adapted to the diameters from 8 to 60 mms., for the softest as well as for the hardest material. This requires relatively high speeds of the spindle, but also small driving wheels, the greatest diameter of work being only 60 mms. For chuck work contrary to the working from rods low speeds of the spindle and the employment of as large gear wheels as possible is required, in order to obtain operation free from vibrations and sufficient reserve power. Thus two opposite conditions result which cannot possibly be combined in an economically advantageous manner.

The turret slide for chuck work should be large in diameter for accommodating the cumbrous box tools to be mounted on it. In order to avoid obstruction by the drilling rods which in some cases are long, the revolving tool box should be arranged in a backwardly inclined position and its slide be guided direct on the bed, which is generally the case in large types of turret lathes in order to increase the stability. A turret slide of this type is on the other hand very unsuitable for working rods as it is too clumsy for such work. The known gear box slides that are guided in guides adjustably mounted on the bed, and which are employed in turret lathes of lighter types, have the disadvantage that during operation they always project to a greater extent from their guides thus facilitating deviation from the work piece. Furthermore, both types of revolving tool box formed an obstruction for the main or cross slide, which itself should be of different construction according to whether it is intended for chuck or rod work. For chuck work the cross slide should be wide and strong, whereas for rod work a somewhat narrower and accordingly lighter cross slide is more suitable.

From these explanations it will be clear that the hitherto known turret lathes do not constitute a perfect solution and accordingly are incapable of yielding the maximum effect, which is so important these days, for any of the types of work for which they are intended.

These disadvantages inherent to the present known turret lathes are intended to be overcome by the present invention. According to the present invention a turret lathe which is only intended for rod work is constructed in a manner quite different from the present turret lathes as regards the head-stock, the revolving tool box, and the number of the independently operating tool slides. This lathe is adapted to the treatment of any material within the range of operation of the machine, and it is enabled to carry out in a minimum amount of time the most complicated work pieces with a maximum number of quite simple tools. According to one feature of the invention the revolving tool box is guided throughout its length and is adapted to work at any place without a transition direct behind the work piece. It is so arranged as to allow its tools to rock freely without obstructing the movement of the main slide, thus allowing the simultaneous operation of up to four carriers.

In the accompanying drawings a constructional example of the invention is illustrated.

Figure 1 is an elevation of the turret lathe as a whole;
Figure 2 is a section on line II—II of Figure 1;
Figure 3 is a section on line III—III of Figure 2;
Figure 4 is a section on line IV—IV of Figure 1;
Figure 5 is a section on line V—V of Figure 4;
Figure 6 is a section of the feed and stop devices for the revolving tool head on line VI—VI of Figure 5;
Figure 7 is a section on line VII—VII of Figure 4, and
Figure 8 is a schematical sectional view of the head-stock casing.

In the illustrated example a turret lathe is as usual provided with a main slide 1 (Figures 1 and 2) on which a tool carrier 1a is mounted, the latter being adapted to receive four different tools (cutters) for longitudinal and transverse cutting. This main slide 1 is provided with automatic feeding arrangements which, being well known in the art, are not shown or described in detail, and are adapted to feed the main slide at any of five different speeds. The revolving tool head is designated as a whole with 2 and is arranged at the longitudinal side of the lathe opposite to the operator's stand so as to enable a separate drilling slide 3 (Figures 4 and 7) to be arranged in the middle of the machine bed 7. Another tool carrier 4 is arranged on the inner end of the spindle stock casing 5 direct above the hollow tool spindle 8 (Figure 2), which is provided with a rod clamping device of a customary type for clamping rod material, this device not being illustrated in the drawings; this additional tool carrier is preferably provided for cutting-off the completed work.

It will thus be seen that altogether four tool carriers 1a, 2, 3 and 4 are provided so as to enable four tools to be put into simultaneous operation if desired. An automatic feed device 6 for the material is, as usual in machines of similar types, supported at its outer end on a stand 134. There is also provided a control lever 133. The device 6 is arranged outside the headstock casing 5 in an axial direction of the lathe.

Referring now to Figure 3, the head-stock of the lathe will be described more in detail. 11 is a pulley to which driving power is supplied from an electro-motor not shown in the drawings, and which is mounted on the outer end of a shaft 10 rotatably mounted in the head-stock casing 5. A gear wheel 12 is secured on the shaft 10 and in engagement with another gear wheel 13, which is splined to another shaft 14. A twin gear wheel 15 is loosely mounted on the shaft 14 and adapted to form one half of a multiple disc clutch, the other half of which is formed by a single gear wheel 16, which is likewise loosely mounted in the shaft 14. A sliding sleeve 17 adapted to be operated by means of a tilting lever 18 projecting from the head-stock casing 5 is mounted on the shaft 14 between the gear wheels 15 and 16 and connected with this shaft by a spline-and-groove arrangement in such a manner that, according to which direction it is displaced in, either the twin gear-wheel 15 or the single gear wheel 16 is driven.

When the sliding sleeve 17 is in engagement with the gear wheel 15 and a gear wheel 22 slidably mounted on a shaft 20 is, by means of an actuating lever 21, brought into engagement with the teeth adjacent the sliding sleeve 17, of the gear wheel 15, the shaft 20 is driven in the same direction of rotation as the pulley 11. On the other hand, when the gear wheel 22 is displaced in the opposite direction by the lever 21, so as to engage into a relatively wide idle gear wheel 23 which is in permanent engagement with the teeth opposite to the sliding sleeve 17, of the twin gear wheel 15, the shaft 20 is rotated in a direction opposite to that of the pulley 11. Furthermore, when the sliding sleeve 17 is brought into engagement with the gear wheel 16, a twin gear wheel 19, which is in engagement with it, and the shaft 20 on which the gear wheel 19 is mounted are rotated in the same direction as the pulley 11, but at a different rate of rotation. The twin gear wheel 19 intermeshes with a gear wheel 25, which is splined on a change wheel shaft 26, and two additional change wheel shafts 27 and 28 are also provided. By sliding four change wheels 29, 30, 31 and 32 in any desired manner on the three change-wheel shafts 26, 27 and 28, the workpiece spindle 8 is enabled to be rotated at a speed in accordance with the material and the diameter of the rod to be worked in each individual case. The change wheels 29, 30, 31 and 32 run in the same oil bath as the other gear parts of the headstock.

The change wheels 29, 30, 31 and 32 are in each case mounted with the cover 9 opened before work is started, and they are only changed when it is required by different conditions of work e. g. in connection with the use of a different material or diameter of the rods. The variations of speed that are required by changing from rough cutting to finishing are effected by means of a twin gear wheel 33 splined on the shaft 28, this twin gear wheel being adapted to be displaced axially on this shaft by means of a lever 34 provided with an actuating fork so as to be selectively brought into engagement with one or other row of teeth of a twin gear wheel 35, which is splined in a fixed position on the workpiece spindle 8. By the gear arrangement as described it is possible to set the work-piece spindle 8 for four different forward and two reverse speeds through the change wheels 29—32 mounted in each case, by simply carrying out switching operations, the reverse speeds being for example required in screw-cutting.

The rotary movement is transmitted from a gear wheel 36, which is likewise rigidly connected with the work-piece spindle 8, on the one hand through a gear wheel 37 to the material-feed spindle 38 (see also Figure 1), and on the other hand through a gear wheel 39 to a feed spindle 42 serving the various tool slides through the intermediary of two pairs of bevel gear-wheels 40 and 40a, which are in operative connection by a shaft 41. For example, the revolving tool head 2, which is adapted to accommodate six different tools, is driven by the feed spindle 42 to feed the individual tools, the movement being transmitted to an auxiliary shaft 44 from the feed spindle 42 through the intermediary of a five-stage toothed-wheel gear (not shown), which is adapted to be set from a control knob 135 (Fig. 4). A worm 45 splined on the auxiliary shaft 44 is in engagement with a worm wheel 46 which is formed as one clutch member of a slipping clutch, this worm wheel being loosely mounted on an extension of the hub of a disc 47 which forms the co-operating clutch member and is secured to a shaft 48.

When the slipping clutch 46 and 47 is engaged the rotary movement transmitted to the shaft 48 is transmitted by a pair of bevel wheels 49 to a vertical shaft 50. This shaft is mounted in a bracket 59 (Figures 4 and 5) and carries at its upper end a pinion 51 for displacing a feed rod 52 for the revolving tool head, part of which rod is formed as a rack. This feed rod 52 is guided in a hollow guiding shaft 53, one end of which is supported in the head-stock casing 5 and the other end of which is supported in the bracket 59. As shown in Figures 5 and 6 a bracket 54 is mounted on that end of this feed rod 52 which is more distant from the tool head 2. Two guiding bars 55 are supported with one of their ends in the two ends of this bracket 54 respectively, and with their other ends in disc 57 which is rotatably connected to the hexagonal tool head 56. In each of the six lateral surfaces of the tool head 56 T-shaped grooves 58 are provided for securing the tools, and the tool head is slidably mounted by means of splines 61 on a hollow shaft 60, which is guided throughout its length, so that the revolving tool head is fully guided in each position.

In operation the rack 52 and with it by means of the bracket or yoke 54 and the guiding rods 55 the tool head 56 is displaced forward i. e. towards the head-stock casing 5 from the shaft 44 through the intermediary of the parts 48, 49, 50 and 51, until a stop pin 62 secured to the yoke 54 (see Figures 5 and 6) abuts against one of six stops 63, which are mounted and adapted to be locked in the desired position in a stop drum 65, which is provided with six longitudinal grooves 64 for these stops. The stop drum 65 is supported on its one side in the support 59 and on its other side in a bracket 66, and is adapted to be displaced by a small distance when one of its stops is engaged by the fixed stop, thus tilting a lever 68, which is rotatably mounted on a pin 67 of the bracket 66. Thereby a rod 69 is displaced in a corresponding manner, and the displacement thereof is transmitted through a leverage not shown to a rod 70 which can be seen in Figure 4, in such a manner that this rod, through the intermediary of a switching lever 71 (Figures 1 and 4), which is operatively connected to the clutch member 47, effects the disengagement of this clutch member, thus putting the automatic feed movement for the tool head 56 out of action.

72 is a hand wheel fixed on the outer end of the shaft 48 and serving to return the tool head 56 to its initial position until it abuts against the support 59, when the automatic feed movement is put out of operation. The wheel 72 can, of course, also be used for manual feeding. When the tool head 56 is returned to its final initial position, the yoke 54 abuts against a stop 73 mounted on the outer end of a releasing rod 74 extending through the hollow feed rod 52 thus displacing the latter in the direction of its displacement against the action of a helical spring 136. By this a mechanism for switching the revolving tool head is released, which is shown in Figures 2, 3 and 8 and will now be described more in detail, and the tool head 56 is revolved by 60°.

This switching mechanism is actuated from the shaft 14 (Figure 8) which rotates at a constant speed, and from which the rotary movement is transmitted through a gear wheel 75 splined thereon to another gear wheel 76 forming a clutch member of a slipping clutch 77, the other clutch member being rigidly connected with a gear wheel 83 intermeshing with a gear wheel 84 loosely mounted on the corresponding end of the shaft 14 and provided with a member 81 of a dog clutch. During the operative movement of the lathe the tool-head switching mechanism runs light, because the associated clutch member 82 is maintained out of engagement with the clutch member 81 in a manner which will presently be described. Now, when the releasing rod 74 is displaced in the manner and direction indicated hereinabove, an inclined cam surface 78 thereof passes below a spring-biassed lifting lever 79 so that a locking bolt 80, on which this lever is pivotally mounted, is raised against the opposing action of a pressure spring 80a (Figure 8). By this action the spring-biassed member 82 of the dog clutch, which is slidably mounted by means of a spline and groove on the shaft 85 and provided with an abutment cam member 98, is unlocked as regards sliding displacement. Accordingly the clutch member 82 will, by means of the spring acting on it, be brought into engagement with the cooperating clutch member 81 and thus rotated.

The slipping clutch 77 should only be considered as a safety measure, in that it will slip when for one reason or another the rotation of the tool head should be prevented by jamming. On the end of the shaft 85 which projects from the head-stock casing 5, there is mounted a cam 86 and a switching lever 87 (Figures 2, 3 and 8) is mounted, and on the outer end of this lever a roller 88 is mounted. When the shaft 85 is rotated the cam 86 effects a rocking movement of a bell-crank lever 89, by which movement a spring-biassed index pin 90, which is pivotally connected with the bell-crank lever, is lifted out of a locking notch 91, six of which are provided in a switching disc 92 fixed to the revolving tool head. Thereupon the switching lever 87 engages with its roller 88 into one of six radial grooves 93 which are arranged in the manner of a Maltese cross in the disc 92 thus rotating this disc by 60° in a known manner. The switching disc 92 is mounted on the end adjacent the headstock of the guiding shaft 60 rotatably mounted on the rigid hollow shaft 53, and accordingly the tool head 56, which is mounted on this guiding shaft by means of splines 61 so as to be slidable, participates in the rotation of the disc 92.

The rotary movement of the guiding shaft 60 is also transmitted by a toothed wheel gear 94, 95, 96 and 97 (Figure 5) provided at its inner end to the abutment drum 65 so that the latter revolves at each sixth of a revolution of the tool head 56 in accordance with the latter and by the same angular amount.

When this partial revolution of the tool head 56 and of the stop drum 65 is completed, the shaft 85 has completed one revolution, and the stop member 98 abuts against the pin 80 which has in the meantime been pressed down, and locks the tool-head switching mechanism until the tool head 56 is again displaced to its initial position after the next following operation by means of the hand wheel 72.

The drilling carriage 3, which is slidably mounted in the middle of the machine bed 7 (Figure 4), and which is also adapted to be used as a tail stock for turning long work pieces and to be clamped at any point of its guidings by means of an eccentric lever 101, is likewise driven from the feed spindle 42 through a link chain 102 (Figures 4 and 8) guided over a sprocket wheel that is connected with an auxiliary shaft 104 by a groove-and-spline connection, this sprocket wheel being itself rotatably mounted on a bracket 105 screwed to the stationary gear box 43. This auxiliary shaft 104 forms the driving shaft of a control gear accommodated in a gear box 103 mounted on the drilling carriage 3.

Through the control gear referred to, which e. g. may be adapted for four speeds and provided with outer control means, a shaft 106 is driven which, as indicated in Figure 4, transfers its motion by means of a worm splined thereto, to the associated worm wheel 108, which is loosely mounted on a shaft 110. Another gear wheel 109, which is also loosely mounted on the shaft 110, is rigidly connected with the worm wheel 108. A clutch member 112 provided with gear teeth is arranged on an auxiliary shaft 111 and is in engagement with the gear wheel 109, and a hand lever 114 is provided by means of which the clutch member 112 can be brought into engagement with the associated clutch member 113. A gear wheel is rigidly connected with the clutch member for transferring the rotary movement to another gear wheel 115 splined to the shaft 110; this shaft on the end of which adjacent the drilling carriage 3 a pinion 116 is mounted, which is in engagement with a rack 117 (Figures 4 and 7) fixed to the drilling mandrel 118, feeds the latter automatically against the work-piece. The drilling mandrel 118 is provided at its end adjacent the work-piece with a morse cone socket 119 and is slidably mounted in the carriage 3. At its other end it carries an adjustable abutment ring 120 (Figure 7). When the drilling mandrel 118 is fed in operation, this abutment ring will finally impinge upon a spring-biassed pin 121 provided with an inclined cam surface 122. Thereby the clutch 112 and 113 is disengaged through the intermediary of a releasing pin 123 (Figure 4) and a lever 114. The automatic feed movement of the drilling mandrel is thus interrupted.

The return movement of the drilling mandrel 118 is manually effected, as in the case of the tool head 56, by means of a hand wheel 124, which can also be used for effecting manual feeding. Supported in the drilling carriage 3 is a longitudinally slidable rod 127, which is also rotatable about its axis. By means of a handle 128 this rod can be locked in the desired position. At its end adjacent the drilling carriage 3 it is provided with a material stop member 125 in which an adjusting screw 126 is provided.

In order to prevent the tools mounted in the revolving tool head 56 from interfering with those mounted in the drilling carriage 3, the tool head is provided at each of its surfaces with an angle-shaped dog 129 (one only being shown in the drawings). When the tool head 56 is returned, the drilling mandrel 118 with the tool mounted therein is pushed by this dog out of the turning range of the tools mounted in the tool head.

The tool holder 4 (Figure 2) serving for cutting-off is made for manual feeding. For this purpose a hand lever 131 is pivotally mounted on a pin 130 and rigidly connected with a pinion which engages into a rack 132 secured to the tool holder 4. By rocking the lever 131 in one direction or the other the tool holder 4 is moved vertically towards or away from the work piece.

In the illustrated example the cutting-off slide 4 is adapted for manual feeding. However arrangements may be made, if desired, for automatically feeding this cutting-off slide.

What I claim is:

1. In a turret lathe for working from rod material, a machine bed, a head-stock mounted on said bed, a main spindle rotatably mounted in said head-stock, a guiding shaft mounted on said bed laterally with respect to, and parallel with, said main spindle, a hollow shaft or sleeve rotatably mounted on said guiding shaft, a revolving tool head mounted on said hollow shaft in a slidable manner, a switching mechanism for revolving said tool head, gear means for operatively connecting said hollow shaft with said switching mechanism, and a groove-and-spline arrangement for preventing relative rotation of said tool head with respect to said hollow shaft.

2. In a turret lathe as claimed in claim 1, an axial hole in the guiding shaft, a feed rod in said hole, this feed rod being provided with an extension on the end of it that is more remote from the tool head, rack teeth on this feed rod, a driving pinion in engagement with said rack teeth, a yoke at the end of said extension, and two displacement rods respectively secured to the two branches of said yoke, said displacement rods being also connected with the tool head.

3. In a turret lathe as claimed in claim 1, an axial hole in the guiding shaft, a feed rod in said hole, this feed rod being provided with an extension on the end of it that is more remote from the tool head, rack teeth on this feed rod, a driving pinion in engagement with said rack teeth, a yoke at the end of said extension, and two displacement rods respectively secured to the two branches of said yoke, said displacement rods being also connected with the tool head, a rotatable stop drum for limiting the feed movement of the tool head, a plurality of stops disposed in spaced relation on the circumference of said drum and mounted there in such a manner as to be adjustable in the longitudinal direction thereof, feeding means for imparting a feed motion to said tool head, an ear on said yoke adapted to impinge upon a predetermined one of said stops when the feed movement of the tool head is completed, a permanently rotating driving shaft, transmitting means for transmitting driving motion from said driving shaft to said feeding means for the tool head, and means controlled by said stops for interrupting the operation of said transmitting means upon impinging of said ear upon one of said stops.

4. In a turret lathe as claimed in claim 1, an axial hole in the guiding shaft, a feed rod in said hole, this feed rod being provided with an extension on the end of it that is more remote from the tool head, rack teeth on this feed rod, a driving pinion in engagement with said rack teeth, a yoke at the end of said extension, and two displacement rods respectively secured to the two branches of said yoke, said displacement rods being also connected with the tool head, a rotatable stop drum, a frame for supporting said stop drum so as to be longitudinally slidable in said frame, feeding means for imparting a feed motion to said tool head, these feeding means comprising a clutch means controlled by the longitudinal displacement of said stop drum, for disengaging said clutch, a number of stops mounted in said stop drum, and an abutment on said yoke adapted to co-operate with one or other of said stops for displacing said stop drum and thus disengaging said clutch.

5. In a turret lathe as claimed in claim 1, an axial hole in the guiding shaft, a feed rod in said hole, this feed rod being provided with an extension on the end of it that is more remote from the tool head, rack teeth on this feed rod, a driving pinion in engagement with said rack teeth, a yoke at the end of said extension, and two displacement rods respectively secured to the two branches of said yoke, said displacement rod being also connected with the tool head, an internal hole in said feed rod, an actuating rod accommodated in said internal hole, said actuating rod having one of its ends projecting beyond said extension and provided with an adjustable abutment, the other end of said actuating rod being operatively connected with said switching mechanism, said switching mechanism being arranged to effect a rotation of the tool head by the desired amount upon the feed rod impinging, in being moved backwardly, against said adjustable abutment.

6. In a turret lathe as claimed in claim 1, a drilling carriage mounted on said bed, a gear box mounted on said drilling carriage and a drilling mandrel mounted in said drilling carriage in an axially slidable manner, a control device for automatically feeding said mandrel arranged in said gear box, this control device controlling a clutch mechanism, an abutment provided on the mandrel, and a release pin mounted in the drilling carriage for co-operation with said abutment and connected with the clutch mechanism so as to disengage the clutch and thus interrupt the feed movement of the mandrel when the abutment impinges upon said release pin.

OTTO SCHAERER.